United States Patent
Dally et al.

(10) Patent No.: US 11,674,738 B2
(45) Date of Patent: Jun. 13, 2023

(54) TESTING ENVIRONMENT FOR CRYOGENIC CHAMBER

(71) Applicant: Quantinuum LLC, Broomfield, CO (US)

(72) Inventors: Adam G. Dally, Champlin, MN (US); Chad J. Langness, Robbinsdale, MN (US); Charles Spencer Nichols, Marietta, GA (US); Stephan F. Furlich, Minnetonka, MN (US)

(73) Assignee: Quantinuum LLC, Broomfield, CO (US)

( * ) Notice: Subject to any disclaimer, the term of this patent is extended or adjusted under 35 U.S.C. 154(b) by 186 days.

(21) Appl. No.: 16/856,719

(22) Filed: Apr. 23, 2020

(65) Prior Publication Data
US 2021/0333038 A1    Oct. 28, 2021

(51) Int. Cl.
*F25D 19/00*   (2006.01)
*F25D 11/04*   (2006.01)
*G01N 1/42*    (2006.01)

(52) U.S. Cl.
CPC ............ *F25D 19/006* (2013.01); *F25D 11/04* (2013.01); *G01N 1/42* (2013.01)

(58) Field of Classification Search
CPC ......... F25D 19/006; F25D 11/04; G01N 1/42; F25B 9/10
See application file for complete search history.

(56) References Cited

U.S. PATENT DOCUMENTS

| | | | |
|---|---|---|---|
| 4,854,131 A | 8/1989 | Sakitani et al. | |
| 7,474,099 B2 | 1/2009 | Boesel et al. | |
| 8,746,008 B1 | 6/2014 | Mauritsen et al. | |
| 9,719,736 B1 * | 8/2017 | Pourrahimi | F28F 13/00 |
| 10,401,448 B2 | 9/2019 | Jonas et al. | |
| 10,998,163 B2 * | 5/2021 | Monroe | H01J 37/08 |

(Continued)

FOREIGN PATENT DOCUMENTS

| | | |
|---|---|---|
| KR | 2016-0031349 A | 3/2016 |
| WO | 2014/018876 A1 | 1/2014 |

OTHER PUBLICATIONS

Machine translation for KR 20160031349 (Year: 2016).*

(Continued)

*Primary Examiner* — Joseph F Trpisovsky
(74) *Attorney, Agent, or Firm* — Alston & Bird LLP

(57) ABSTRACT

An experimental payload and cryogenic system are provided. An experimental payload including a cryogenic chamber is provided. The cryogenic chamber includes an action chamber configured to be cryogenically cooled to an action temperature. The cryogenic chamber also includes an inner cooling ring cooled via an internal braiding system. The inner cooling ring is configured to operate at a first temperature. The cryogenic chamber further includes an outer ring in communication with the inner cooling ring. The outer ring is configured to absorb heat from the experimental payload. The outer ring defines a second temperature that is greater than the first temperature. The cryogenic chamber also includes a plurality of legs operably coupled to the cryogenic chamber at a top end of each leg. The legs are characterized by a low thermal conductivity and the experimental payload is configured to be attached to a base of a cryocooler.

22 Claims, 3 Drawing Sheets

(56) References Cited

U.S. PATENT DOCUMENTS

2010/0050661 A1    3/2010   Snow et al.
2015/0300719 A1    10/2015  Strickland et al.

OTHER PUBLICATIONS

Extended European Search Report issued in European Application No. 21158832.2 dated Jul. 22, 2021, 10 pages.
Lamb, I.C. (2017). Cryogenic Control beyond 100 Qubits. [Master of Science Thesis, School of Physics, The University of Sydney]. https://ses.library.usyd.edu.au/bitstream/handle/2123/17046/thesis_20170727.pdf;jsessionid=EF32157B77FCF5470458BB949BB6F145?sequence=1.

* cited by examiner

TESTING ENVIRONMENT FOR CRYOGENIC CHAMBER

FEDERALLY SPONSORED RESEARCH OR DEVELOPMENT

This invention was made with United States Government support. The United States Government has certain rights in the invention.

TECHNICAL FIELD

Various embodiments relate to a cryogenic cooling system. For example, various embodiments relate to a cryogenic cooling system with low-vibration for use in ultra-high vacuum environments.

BACKGROUND

In various scenarios, an action (e.g., experiment, controlled state evolution, reaction, function performance, and/or the like) is to be carried out an action temperature that is a cryogenic temperature. Generally, temperatures in the range of 0 K to 124 K are considered cryogenic temperatures. Some of these actions require precise control of other environmental parameters in addition to temperature. For example, the action may require being performed within a region where the amount of vibration (e.g., due to cooling) is minimal. Through applied effort, ingenuity, and innovation, many of these identified problems have been solved by the methods and apparatus of the present disclosure.

BRIEF SUMMARY OF EXAMPLE EMBODIMENTS

The following presents a simplified summary in order to provide a basic understanding of some aspects of the present disclosure. This summary is not an extensive overview and is intended to neither identify key or critical elements nor delineate the scope of such elements. Its purpose is to present some concepts of the described features in a simplified form as a prelude to the more detailed description that is presented later.

In an example embodiment, an experimental payload configured for a cryocooler is provided. The experimental payload includes a cryogenic chamber. The cryogenic chamber also includes an action chamber configured to be cryogenically cooled to an action temperature. The cryogenic chamber also includes an inner cooling ring cooled via an internal braiding system. The inner cooling ring is configured to operate at a first temperature. The cryogenic chamber further includes an outer ring in communication with the inner cooling ring. The outer ring is configured to absorb heat from the experimental payload and the outer ring defines a second temperature that is greater than the first temperature. The cryogenic chamber still further includes a plurality of legs operably coupled to the cryogenic chamber at a top end of each leg. The legs are characterized by a low thermal conductivity. The experimental payload is configured to be attached to a base of a cryocooler.

In some embodiments, the action temperature is defined between the first temperature and the second temperature. In some embodiments, the experimental payload is configured to be attached to the base of the cryocooler via one or more thermal braids. In some embodiments, the experimental payload is configured to be used within a vacuum. In some embodiments, the cryogenic chamber further includes a thermal shield defined around the action chamber. In some embodiments, the plurality of legs are made out of plastic. In some embodiments, the plurality of legs are operably coupled to a vacuum baseplate at a bottom end of each leg. In some embodiments, the thermal shield of the experimental payload is attached to the base of the cryocooler via one or more thermal braids. In some embodiments, the experimental payload also includes the cryocooler. In such an embodiment, the cryocooler is configured with a closed circuit cooling system configured to reduce vibration during operation. In some embodiments, the closed circuit cooling system comprises helium. In various embodiments, the closed circuit cooling system conducts heats away from the experimental payload. In some embodiments, the inner cooling ring is less than 100 Kelvin during operation of the experimental payload.

In another example embodiment, a cryogenic system is provided. The cryogenic system includes an experimental payload discussed above. The cryogenic system also includes a cryocooler with a closed circuit helium cooling system in operable communication with the experimental payload via one or more thermal braids. The cryogenic system defines a vibration gap between the cryocooler and the experimental payload.

In some embodiments, the action temperature is defined between the first temperature and the second temperature. In some embodiments, the experimental payload is configured to be attached to the base of the cryocooler via one or more thermal braids. In some embodiments, the experimental payload is configured to be used within a vacuum. In some embodiments, the cryogenic chamber further includes a thermal shield defined around the action chamber. In some embodiments, the plurality of legs are made out of plastic. In some embodiments, the plurality of legs are operably coupled to a vacuum baseplate at a bottom end of each leg. In some embodiments, the thermal shield of the experimental payload is attached to the base of the cryocooler via one or more thermal braids. In some embodiments, the experimental payload also includes the cryocooler. In such an embodiment, the cryocooler is configured with a closed circuit cooling system configured to reduce vibration during operation. In some embodiments, the closed circuit cooling system comprises helium. In some embodiments, the inner cooling ring is less than 100 Kelvin during operation of the experimental payload.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE SEVERAL VIEWS OF THE DRAWINGS

Figure 1:
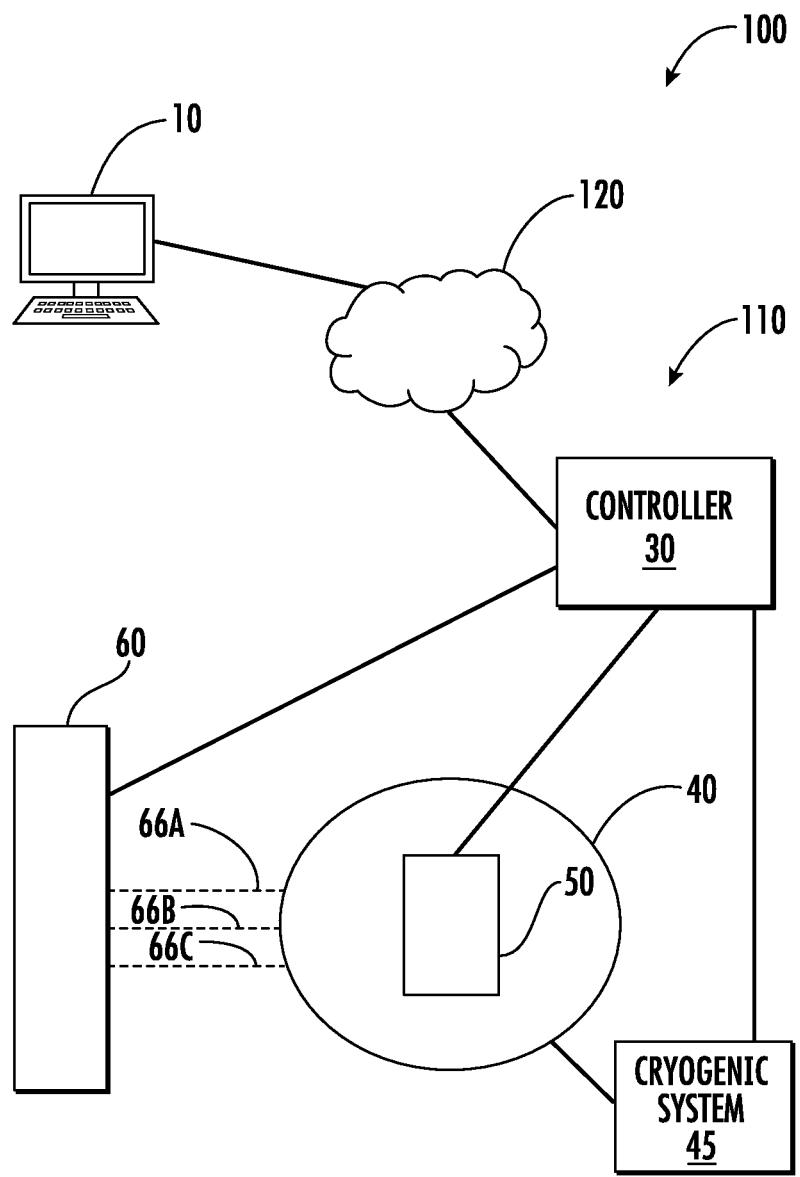
Figure 2:
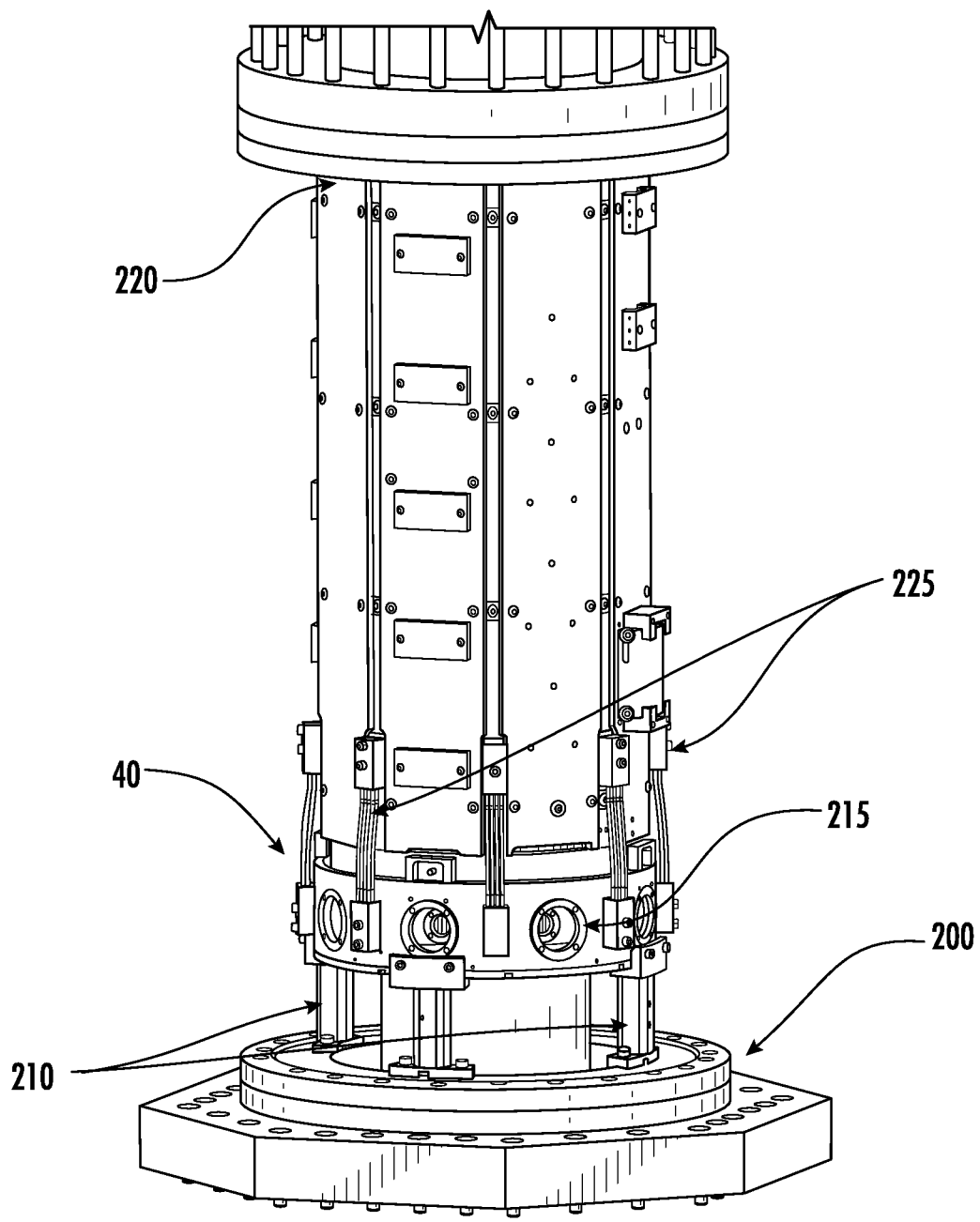
Figure 3:
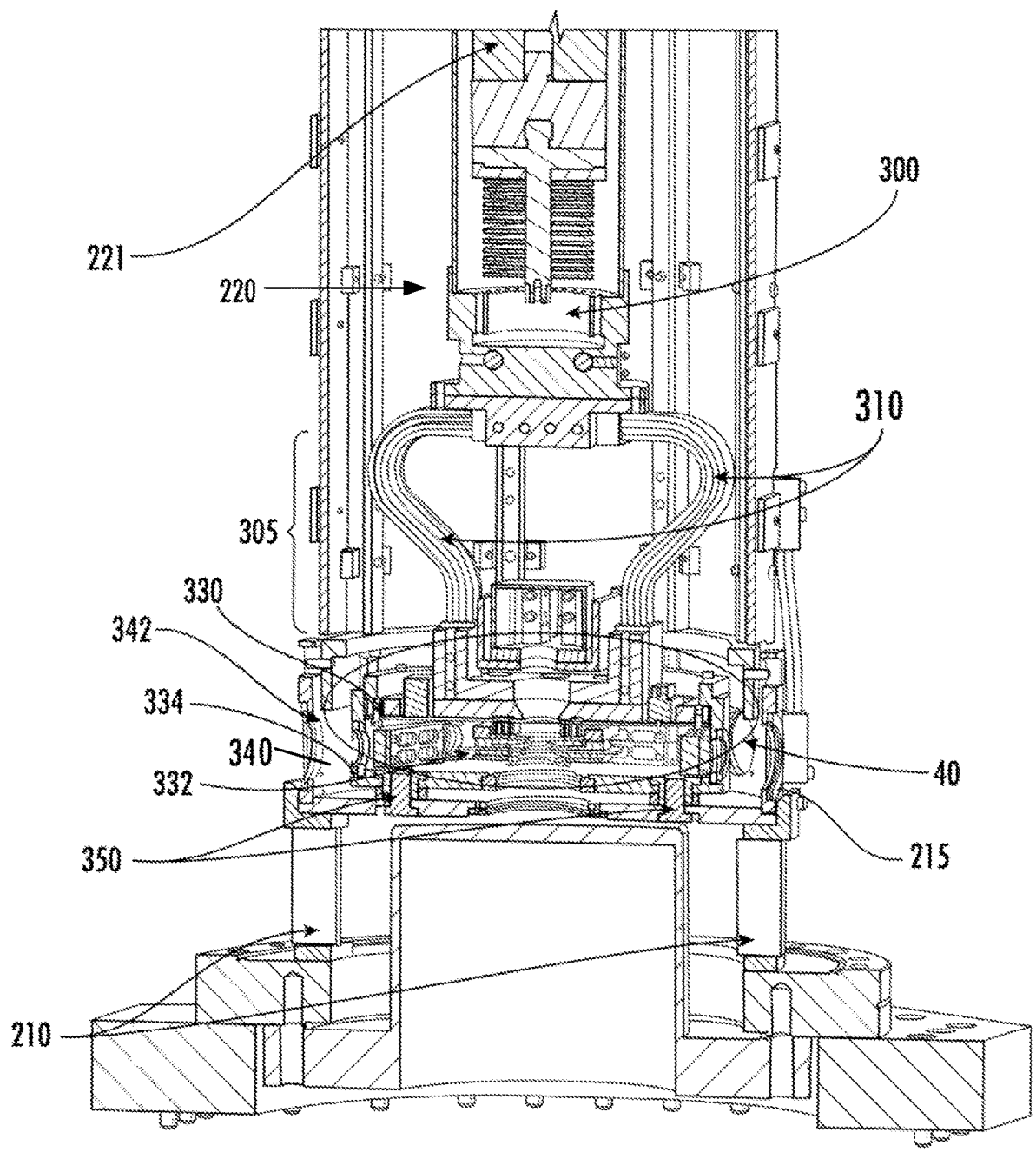

Having thus described the invention in general terms, reference will now be made to the accompanying drawings, which are not necessarily drawn to scale, and wherein:

FIG. 1 provides a schematic diagram of an example action system, in accordance with an example embodiment;

FIG. 2 provides an exterior view of a cryogenic system in accordance with an example embodiment; and FIG. 3 provides a cross-section view of an example cryogenic system, including an example cryogenic chamber, in accordance with an example embodiment.

DETAILED DESCRIPTION OF SOME EXAMPLE EMBODIMENTS

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. The terms "generally" and "approximately" refer to within engineering and/or manufacturing limits and/or within user measurement capabilities, unless otherwise indicated. Like numbers refer to like elements throughout.

As described above, in various cryogenic systems, it is important to be able to reduce vibration caused by the cryocoolers. Various embodiments of the present disclosure uses a closed circuit cryocooler configured with low vibration and ultra-high vacuum. While various embodiments are discussed for use with quantum computing, various embodiments may also be used in other applications, such as MRI or MEG applications in the health field. In various embodiments, the action chamber is defined by an interior housing of the cryogenic chamber. For example, the interior housing may be disposed within the cryogenic chamber. The interior housing may comprise housing walls that define the action chamber within the interior housing. In various embodiments, the interior housing is disposed within a thermal and/or electro-magnetic field shield.

In various embodiments, the cryogenic chamber comprises an outer housing that defines a main chamber of the cryogenic chamber. For example, the interior housing and the action chamber are disposed within the main chamber of the cryogenic chamber. In various embodiments, an exterior shield is disposed outside of the outer housing. For example, the exterior shield may comprise at least one sheet of a second material that dads the outer surface of the outer housing. In various embodiments, the second material is a metal, metal alloy, and/or other rigid material. In various embodiments, the second material may be different from the first material of the interior shield. In various embodiments, the exterior shield is expected to be at an outer shield temperature when the action chamber is maintained at the action temperature (e.g., by a cryogenic system). In an example embodiment, the outer shield temperature is in the range of approximately 30-100 K. In an example embodiment, the outer temperature is room temperature (e.g., approximately 300 K).

In various embodiments, one or more intermediate shields 215 may be disposed between an inner surface of the outer housing and the housing walls of the interior housing. In an example embodiment, two intermediate shields are disposed between the inner surface of the outer housing and the housing walls of the interior housing. For example, an intermediate shield may be disposed within the main chamber and outside of the interior housing. In various embodiments, an intermediate shield comprises at least one sheet of a third material. The third material may be a metal, metal alloy, and/or other high thermal conductivity material. In various embodiments, the third material may be different from the first material of the interior shield and/or the second material of the outer shield. In various embodiments, the intermediate shield is expected to be at an intermediate temperature when the action chamber is maintained at the action temperature (e.g., by a cryogenic system). In an example embodiment, the intermediate temperature is in the range of approximately 30-100 K. In an example embodiment, the intermediate temperature is 40 K.

In various embodiments, the interior housing and outer housing include one or more access openings. In various embodiments, the access openings may provide an optical path for a laser beam to enter the action chamber for use in the action, provide an optical path for photons generated during the action to leave the action chamber, permit a fiber optic or electrical cable to pass through the outer and/or interior housing, and/or the like. In an example embodiment, the cryogenic system is part of a quantum computer, such as a trapped ion quantum computer. In an example embodiment, the actions include preparing one or more qubits of the quantum computer (e.g., within an ion trap), performing a controlled state evolution of one or more qubits of the quantum computer (e.g., via application of one or more quantum logic gates), stimulating emission of one or more qubits of the quantum computer (e.g., to read the qubit), and/or the like.

Exemplary Quantum Computer System

FIG. 1 provides a schematic diagram of an example trapped ion quantum computer system 100, in accordance with an example embodiment. In various embodiments, the trapped ion quantum computer system 100 comprises a computing entity 10 and a quantum computer 110. In various embodiments, the quantum computer 110 comprises a controller 30, a cryogenic chamber 40 enclosing an ion trap 50, and one or more laser sources 60. In various embodiments, the one or more laser sources 60 are configured to provide one or more laser beams to the ion trap 50 within an action chamber 332 (See FIG. 3) of the cryogenic chamber 40. In an example embodiment, the cryogenic chamber and/or a portion thereof (e.g., including the action chamber) is also a vacuum chamber.

In various embodiments, a computing entity 10 is configured to allow a user to provide input to the quantum computer 110 (e.g., via a user interface of the computing entity 10) and receive, view, and/or the like output from the quantum computer 110. The computing entity 10 may be in communication with the controller 30 via one or more wired or wireless networks 120 and/or via direct wired and/or wireless communications. In an example embodiment, the computing entity 10 may translate, configure, format, and/or the like information/data, quantum computing algorithms, and/or the like into a computing language, executable instructions, command sets, and/or the like that the controller 30 can understand and/or implement.

In various embodiments, the controller 30 is configured to control the ion trap 50, cryogenic system 45 and/or vacuum system controlling the temperature and pressure within the cryogenic chamber 40, and/or other systems controlling the environmental conditions (e.g., temperature, humidity, pressure, and/or the like) within the cryogenic chamber 40. For example, the cryogenic system 45 may be configured to maintain the action chamber 332 at the action temperature. In various embodiments, the action temperature is a cryogenic temperature (e.g., in the range of approximately 124 K to 0 K) and the cryogenic system 45 is a cryogenic cooling system. In various embodiments, the cryogenic system 45 is also comprises a vacuum system configured to maintain the main chamber 342 and/or the action chamber 332 at a particular pressure. In various embodiments, the controller 30 is configured to control various components of the quantum computer 110 in accordance with executable instructions, command sets, and/or the like provided by the computing entity 10. In various embodiments, the controller 30 is configured to receive output from the quantum computer 110 (e.g., from an optical collection system) and provide the output and/or the result of a processing of the output to the computing entity 10.

In various embodiments, the one or more laser sources 60 are configured to generate laser beams and provide the laser beams to the cryogenic chamber 40 (and/or the action chamber 332) via one or more optical fibers or other optical paths, such that laser beams are accurately and precisely delivered to qubit ions within the ion trap 50 (e.g., precisely in terms of position, frequency, and/or phase). In various embodiments, the optical fibers 64 and/or other optical path and/or wave guide may provide the laser beams to the ion trap 50 and/or action chamber 332 via one or more access openings and/or shield openings.

Exemplary Cryogenic Chamber

FIG. 2 is an exterior view of a cryogenic system in accordance with an example embodiment. As shown, the cryogenic system is for use in a vacuum. The cryogenic system may include a vacuum baseplate 200 on which one or more insulating legs 210 are attached. The insulating legs 210 are attached to the cryogenic chamber 40 discussed herein. In various embodiments, the cryogenic chamber 40 may have a thermal shield 215 configured around the cryogenic chamber 40. In various embodiments, the thermal shield 215 may be made out of a good thermal conductor. In some embodiment, a material having thermal conductivity greater than approximately 1 Watt per Meter per Kelvin may be used to make the thermal shield 215. In some embodiment, a material having thermal conductivity greater than approximately 10 Watt per Meter per Kelvin may be used to make the thermal shield 215. In various embodiments, the cryogenic chamber 40 may be connected to a cryocooler 220 via one or more thermal braids 225. As shown in FIG. 3, there may be a gap 305 between the cryocooler 220 and the cryogenic chamber 40 (e.g., to reduce vibration). In various embodiments, the cryocooler 220 may have a closed circuit fluid cooling system 300. For example, the cryocooler 220 may have a closed circuit helium exchange space configured to cool the cryogenic system (e.g., the helium conducts the heat away from the action chamber). In an example embodiments, the cryogenic cooler may reuse the helium, such that no additional helium may be needed during operation. In various embodiments, the thermal braids 310 may be configured to transfer heat between the cryocooler 220 and the cryogenic chamber 40. As such, the cryocooler 220 may be configured to cool the cryogenic chamber 40 (e.g., the inner cooling ring 330) during operation of the cryogenic chamber 40. In various embodiments, the cryocooler may be a first stage of a multi-stage cryocooler, such that additional stages are attached vertically to the first stage cryocooler (e.g., Second stage cryocooler 221 may be attached to the first stage cryocooler 220).

In various embodiments, the cryocooler 220 may be held in place vertically via a crane and/or the like. In various embodiments, the vibration gap 305 between the cryocooler 220 and the cryogenic chamber 40 may allow for a reduction in the vibration experienced by the cryogenic chamber 40 based on the cryocooler 220. As such, one or more of the thermal braid(s) 310 may connect the cryocooler 220 to the cryogenic chamber 40 (e.g., connecting the cryocooler and the cryogenic chamber through the vibration gap 305). In various embodiments, the cryogenic chamber 40 may be suspended by the one or more thermal braids that connects the cryogenic chamber 40 to the cryocooler 220. In various embodiments, the cryocooler 220 may be suspended from above by a crane or other device to hold the cryocooler 220 in the middle of the helium exchange space 300. In various embodiments, the thermal braids have a high thermal conductivity that allows the experimental payload to get cold.

FIG. 3 provides a view of a cryogenic chamber 40. In various embodiments, the cryogenic chamber 40 comprises an interior housing 330 and an outer housing 340. In various embodiments, the interior housing 330 comprises housing walls 334. In various embodiments, the interior walls 334 define the inner ring discussed herein. The housing walls 334 define an action chamber 332. In various embodiments, one or more actions may be performed within the action chamber at a corresponding action temperature. For example, the actions may include performing an experiment, a controlled state evolution, a chemical reaction, performing a function, and/or the like. In an example embodiment, the ion trap 50 of an ion trapped quantum computer 110 is disposed within the action chamber 332. In various embodiments, the outer housing 340 defines a main chamber 342. The interior housing 330 and the action chamber 332 are disposed within the main chamber 342. In various embodiments, the interior housing 330 may have one or more windows for optical access. Alternatively, no windows may be provided on the interior housing such that no light can penetrate the interior housing 330. In various embodiments, the interior housing 330 and/or the outer housing 340 are made of metal. For example, the interior housing 330 and/or the outer housing 340 may be made of a high thermal conductive material, such as copper.

In various embodiments, the cryogenic chamber 40 may have one or more insulating feet 350 configured with minimal thermal conductivity, such that little to no heat transfer occurs. In various embodiments, the insulating feet 350 may be made out of a low thermal conductive material, such a plastic or a ceramic (e.g., the insulating feet 350 may be made out of a polyimide, such as Vespel). In an example embodiment, the thermal conductivity of the insulating feet 350 may be less than 1 Watt per Meter per Kelvin. In an example embodiment, the thermal conductivity of the insulating feet 350 may be less than 0.5 Watt per Meter per Kelvin. In an example embodiment, the thermal conductivity of the insulating feet 350 may be less than 0.25 Watt per Meter per Kelvin. In an example embodiment, the thermal conductivity of the insulating feet 350 may be approximately 0.1 Watt per Meter per Kelvin.

Additionally, cryogenic chamber 40 may be connected to the vacuum base plate 200 via one or more insulating legs 210. In various embodiments, the insulating legs 210 may be made out of a material having low thermal conductivity, such a plastic or a ceramic (e.g., the insulating legs 210 may be made out of a ceramic, such as Macor). In an example embodiment, the thermal conductivity of the insulating feet 350 may be less than 2 Watt per Meter per Kelvin. In an example embodiment, the thermal conductivity of the insulating feet 350 may be less than 1.5 Watt per Meter per Kelvin. In an example embodiment, the thermal conductivity of the insulating feet 350 may be less than 1.25 Watt per Meter per Kelvin. In an example embodiment, the thermal conductivity of the insulating feet 350 may be approximately 1 Watt per Meter per Kelvin. For example, the insulating legs 210 may be made out of plastic in an instance in which the cryogenic chamber 40 may be made out of copper, aluminum, a combination thereof, and/or the like. In some embodiments, the insulating legs 210 may be made out of a ceramic material.

The cryogenic chamber is coupled to a cryogenic system configured to maintain the action chamber 332 and/or the interior housing 330 at an action temperature. When the action chamber 332 is maintained at the action temperature the outer housing 340 is maintained at a second temperature. In various embodiments, the action temperatures are cryogenic temperatures (e.g., within the range of 0 K to 124 K). In various embodiments, the interior housing 330 and/or the outer housing 340 comprise access openings. In various embodiments, the access openings allow for laser beams to enter the main chamber 342 and/or the action chamber 332; fiber optics and/or electrical cables to provide laser beams, electrical signals, and/or the like to the inside of main chamber 342 and/or the action chamber 332; and/or the like.

In various embodiments, the cryogenic chamber 40 is configured to insulate the action chamber 332 such that the action chamber 332 may be maintained at the action temperature by the cryogenic system 45. In various embodiments, the cryogenic chamber 40 is configured to seal the main chamber 342 and/or action chamber 332 from the external environment that is exterior to the cryogenic chamber 40 such that the pressure within the main chamber 342 and/or action chamber 332 may be controlled independently of the external environment. For example, the cryogenic chamber 40 may be a vacuum chamber.

In various embodiments, the cryogenic chamber 40 may have an inner cooling ring 330 that may be attached to an internal braiding system (e.g., the thermal braids 225 from the cryocooler 220 may provide cooling to the inner cooling ring 330). In various embodiments, the inner cooling ring 330 is configured to be maintained at a relatively low temperature (e.g., a first temperature). In some embodiments, the inner cooling ring 330 may be maintained at less than 10 K. In some embodiments, the inner cooling ring 330 may be maintained at less than 7 K. In some embodiments, the inner cooling ring may be maintained at approximately 4 K. In various embodiments, the action temperature of the action chamber may be at or near the first temperature of the inner cooling ring 330 (e.g., the action chamber may be at or slightly above the first temperature of the inner cooling ring 330). Additionally, in various embodiments, the action chamber may have a plurality of layers, such that the inner most layer may have a temperature at or near the first temperature of the inner cooling ring (e.g. less than 10 K), while the next layer may be at a higher temperature (e.g., the temperature of the next layer may be approximately 40 K). In various embodiments, the temperature of the thermal shield 215 during operation may be less than 50 K.

In various embodiments, the cryogenic chamber 40 may include an outer ring configured to transfer heat with the inner cooling ring 330. In various embodiments, the outer ring may be configured to operate at a second temperature greater than the first temperature of the inner cooling ring 330. In some embodiments, the temperature of the outer ring may be from 200 K to 400 K. In some embodiments, the temperature of the outer ring may be from 250 K to 350 K. In some embodiments, the temperature of the outer ring may be 300 K.

CONCLUSION

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An experimental payload configured for a cryocooler, the experimental payload comprising:
    a cryogenic chamber comprising:
        an action chamber configured to be cryogenically cooled to an action temperature;
        an interior housing cooled via an internal braiding system, wherein the interior housing is configured to operate at a first temperature and the interior housing defines the action chamber; and
        an outer housing in thermal communication with the interior housing, wherein the outer housing is configured to absorb heat from the experimental payload, wherein the outer housing defines a second temperature that is greater than the first temperature;
    one or more thermal braids, wherein the one or more thermal braids are configured to be the only source of suspension of the cryogenic chamber from a base of a cryocooler; and
    a plurality of legs operably coupled to the cryogenic chamber at a top end of each leg, wherein the legs are characterized by a low thermal conductivity.

2. The experimental payload of claim 1, wherein the action temperature is defined between the first temperature and the second temperature.

3. The experimental payload of claim 1, wherein the experimental payload is configured to be used within a vacuum.

4. The experimental payload of claim 1, wherein the cryogenic chamber further comprises a thermal shield defined around the action chamber.

5. The experimental payload of claim 1, wherein the plurality of legs are made out of plastic.

6. The experimental payload of claim 1, wherein the plurality of legs are operably coupled to a vacuum baseplate at a bottom end of each leg.

7. The experimental payload of claim 4, wherein the thermal shield of the experimental payload is attached to the base of the cryocooler via the one or more thermal braids.

8. The experimental payload of claim 1, further comprising the cryocooler, wherein the cryocooler is configured with a closed circuit cooling system configured to reduce vibration during operation.

9. The experimental payload of claim 8, wherein the closed circuit cooling system comprises helium.

10. The experimental payload of claim 1, wherein the interior housing is less than 100 Kelvin during operation of the experimental payload.

11. A cryogenic system comprising:
    an experimental payload comprising a cryogenic chamber;
    one or more thermal braids; and
    a cryocooler with a closed circuit helium cooling system in operable communication with the experimental payload via the one or more thermal braids,
    wherein the cryogenic chamber is suspended from a base of the cryocooler by only the one or more thermal braids, and the cryogenic chamber comprises:

an action chamber configured to be cryogenically cooled to an action temperature;

an interior housing cooled via an internal braiding system, wherein the interior housing is configured to operate at a first temperature and defines the action chamber; and an outer housing in thermal communication with the interior housing, wherein the outer housing is configured to absorb heat from the experimental payload, wherein the outer housing defines a second temperature that is greater than the first temperature;

wherein the cryogenic system defines a vibration gap between the cryocooler and the experimental payload.

12. The cryogenic system of claim 11, wherein the action temperature is defined between the first temperature and the second temperature.

13. The cryogenic system of claim 11, wherein the experimental payload is configured to be used within a vacuum.

14. The cryogenic system of claim 11, wherein the cryogenic chamber further comprises a thermal shield defined around the action chamber.

15. The cryogenic system of claim 14, wherein the thermal shield of the experimental payload is attached to the base of the cryocooler via the one or more thermal braids.

16. The cryogenic system of claim 11, wherein the cryocooler is configured with a closed circuit cooling system configured to reduce vibration during operation.

17. The cryogenic system of claim 11, wherein the interior housing is less than 100 Kelvin during operation of the experimental payload.

18. The cryogenic system of claim 11, wherein the experimental payload further comprises a plurality of legs operably coupled to the cryogenic chamber at a top end of each leg, wherein the legs are characterized by a low thermal conductivity.

19. The cryogenic system of claim 18, wherein the plurality of legs are made out of plastic.

20. The cryogenic system of claim 18, wherein the plurality of legs are operably coupled to a vacuum baseplate at a bottom end of each leg.

21. The cryogenic system of claim 11, wherein the interior housing and the outer housing each comprise one or more access openings configured to provide at least one optical path to the action chamber.

22. The cryogenic system of claim 11, wherein an ion trap is disposed within the action chamber.

* * * * *